(12) United States Patent
Thörn et al.

(10) Patent No.: US 8,378,985 B2
(45) Date of Patent: Feb. 19, 2013

(54) TOUCH INTERFACE FOR THREE-DIMENSIONAL DISPLAY CONTROL

(75) Inventors: Ola Thörn, Malmö (SE); Peter Åberg, Vinslöv (SE); Erik Backlund, Gantofta (SE); Henrik Bengtsson, Lund (SE); Jari Sassi, Lund (SE); Henrik Heringslack, Malmö (SE)

(73) Assignee: Sony Mobile Communications AB, Lund (SE)

( * ) Notice: Subject to any disclaimer, the term of this patent is extended or adjusted under 35 U.S.C. 154(b) by 342 days.

(21) Appl. No.: 12/787,446

(22) Filed: May 26, 2010

(65) Prior Publication Data

US 2011/0291943 A1 Dec. 1, 2011

(51) Int. Cl.
*G06F 3/041* (2006.01)
(52) U.S. Cl. ........................ 345/173; 715/863
(58) Field of Classification Search .......... 345/173–184; 379/428.01; 715/863–864; 178/18.01–19.07
See application file for complete search history.

(56) References Cited

U.S. PATENT DOCUMENTS

| | | | |
|---|---|---|---|
| 2009/0256809 A1* | 10/2009 | Minor | 345/173 |
| 2009/0315834 A1* | 12/2009 | Nurmi et al. | 345/173 |
| 2010/0013863 A1* | 1/2010 | Harris | 345/679 |
| 2010/0115455 A1* | 5/2010 | Kim | 715/781 |
| 2010/0149129 A1* | 6/2010 | Homma et al. | 345/174 |

\* cited by examiner

*Primary Examiner* — Liliana Cerullo
(74) *Attorney, Agent, or Firm* — Snyder, Clark, Lesch & Chung LLP (57) ABSTRACT

An electronic device includes a first touch panel disposed on a first side of the device. The first touch panel receives a first touch input. The electronic device further includes a display disposed on the first side of the device, and a touch interface disposed on a second side of the device, where the second side is different than the first side. The touch interface receives a second touch input. A control unit receives an indication of the first touch input from the first touch panel and receives an indication of the second touch input from the touch interface. The control unit further determines alterations to a three dimensional view of the display in the x, y and/or z directions based on the first touch input, and rotates the three dimensional view on the display angularly in accordance with movement of the second touch input.

18 Claims, 9 Drawing Sheets

TOUCH INTERFACE FOR THREE-DIMENSIONAL DISPLAY CONTROL

BACKGROUND

Many different types of consumer electronics devices nowadays typically include a touch screen that may act as an output device that displays image, video and/or graphical information, and which further may act as an input touch interface device for receiving touch control inputs from a user. A touch screen (or touch panel, or touch panel display) may detect the presence and location of a touch within the area of the display, where the touch may include a touching of the display with a body part (e.g., a finger) or with certain objects (e.g., a stylus). Touch screens typically enable the user to interact directly with what is being displayed, rather than indirectly with a cursor controlled by a mouse or touchpad. Touch screens have become widespread in use with various different types of consumer electronic devices, including, for example, cellular radiotelephones, personal digital assistants (PDAs), and hand-held gaming devices.

SUMMARY

In one exemplary embodiment, an electronic device may include a first touch panel disposed on a first side of the device and configured to receive a first touch input, and a display disposed on the first side of the device. The electronic device may further include a touch interface configured to receive a second touch input, wherein the touch interface is disposed on a second side of the device that is different than the first side of the device. The electronic device may also include a control unit configured to: receive an indication of the first touch input from the first touch panel, receive an indication of the second touch input from the touch interface, determine alterations to a three dimensional view of the display in the x, y and/or z directions based on the first touch input, and rotate the three dimensional view on the display angularly in accordance with movement of the second touch input.

Additionally, when rotating the three dimensional view on the display angularly in accordance with movement of the second touch input, the control unit may be further configured to adjust the three dimensional view within 360 degrees on the x and y axis in a direction corresponding to the second touch input.

Additionally, the electronic device may include a hand-held electronic device.

Additionally, the electronic device may include one of a cellular radiotelephone, a satellite navigation device, a smart phone, a Personal Communications System (PCS) terminal, a personal digital assistant (PDA), a gaming device, a media player device, a tablet computer, or a digital camera.

Additionally, the first touch panel may include at least one of a near field-sensitive, an acoustically-sensitive, or a photo-sensitive touch panel.

Additionally, touch interface may include one of a joystick or a second touch panel.

Additionally, the second touch panel may include at least one of a near field-sensitive, an acoustically-sensitive, or a photo-sensitive touch panel.

Additionally, the display may include a liquid crystal display (LCD), a cathode ray tube (CRT) display, an organic light-emitting diode (OLED) display, a surface-conduction electro-emitter display (SED), a plasma display, a field emission display (FED), or a bistable display.

Additionally, the first touch panel may be integrated with, or overlaid upon, the display.

In another exemplary embodiment, a method may include receiving an indication of a first touch input on a first touch panel disposed on an electronic device, and receiving an indication of movement of a second touch input on a touch interface that is disposed on the electronic device separately from the first touch panel. The method may further include determining alterations to a three dimensional view of a display disposed on the electronic device in the x, y and/or z directions based on the indication of the first touch input, and rotating the three dimensional view on the display angularly in accordance with the movement of the second touch input.

Additionally, rotating the three dimensional view on the display may include adjusting the three dimensional view within 360 degrees on the x and y axis in a direction corresponding to the second touch input.

Additionally, the electronic device may include one of a cellular radiotelephone, a satellite navigation device, a smart phone; a Personal Communications System (PCS) terminal, a personal digital assistant (PDA), a gaming device, a media player device, a tablet computer, or a digital camera.

Additionally, the first touch panel may include at least one of a near field-sensitive, an acoustically-sensitive, or a photo-sensitive touch panel.

Additionally, the touch interface may include one of a joystick or a second touch panel.

Additionally, the second touch panel may include at least one of a near field-sensitive, an acoustically-sensitive, or a photo-sensitive touch panel.

Additionally, the display may include a liquid crystal display (LCD), a cathode ray tube (CRT) display, an organic light-emitting diode (OLED) display, a surface-conduction electro-emitter display (SED), a plasma display, a field emission display (FED), or a bistable display.

In yet another exemplary embodiment, a hand-held electronic device may include a display and a first touch panel configured to receive a first touch input, wherein the first touch panel is integrated with, or overlaid upon, the display. The hand-held electronic device may further include a touch interface configured to receive a second touch input, wherein the touch interface is separate from the first touch panel and wherein the touch interface comprises a second touch panel or a joystick. The hand-held electronic device may also include a control unit configured to adjust a three dimensional view on the display based on the first touch input and the second touch input.

Additionally, the hand-held electronic device may include one of a cellular radiotelephone, a satellite navigation device, a smart phone, a Personal Communications System (PCS) terminal, a personal digital assistant (PDA), a gaming device, a media player device, or a digital camera and the display may include a liquid crystal display (LCD), a cathode ray tube (CRT) display, an organic light-emitting diode (OLED) display, a surface-conduction electro-emitter display (SED), a plasma display, a field emission display (FED), or a bistable display.

Additionally, each of the first touch panel and the second touch panel may include at least one of a near field-sensitive, an acoustically-sensitive, or a photo-sensitive touch panel.

Additionally, the hand-held electronic device may include a front side and a rear side, and wherein the display and first touch panel are disposed on the front side and the touch interface is disposed on the rear side.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

Figure 1:
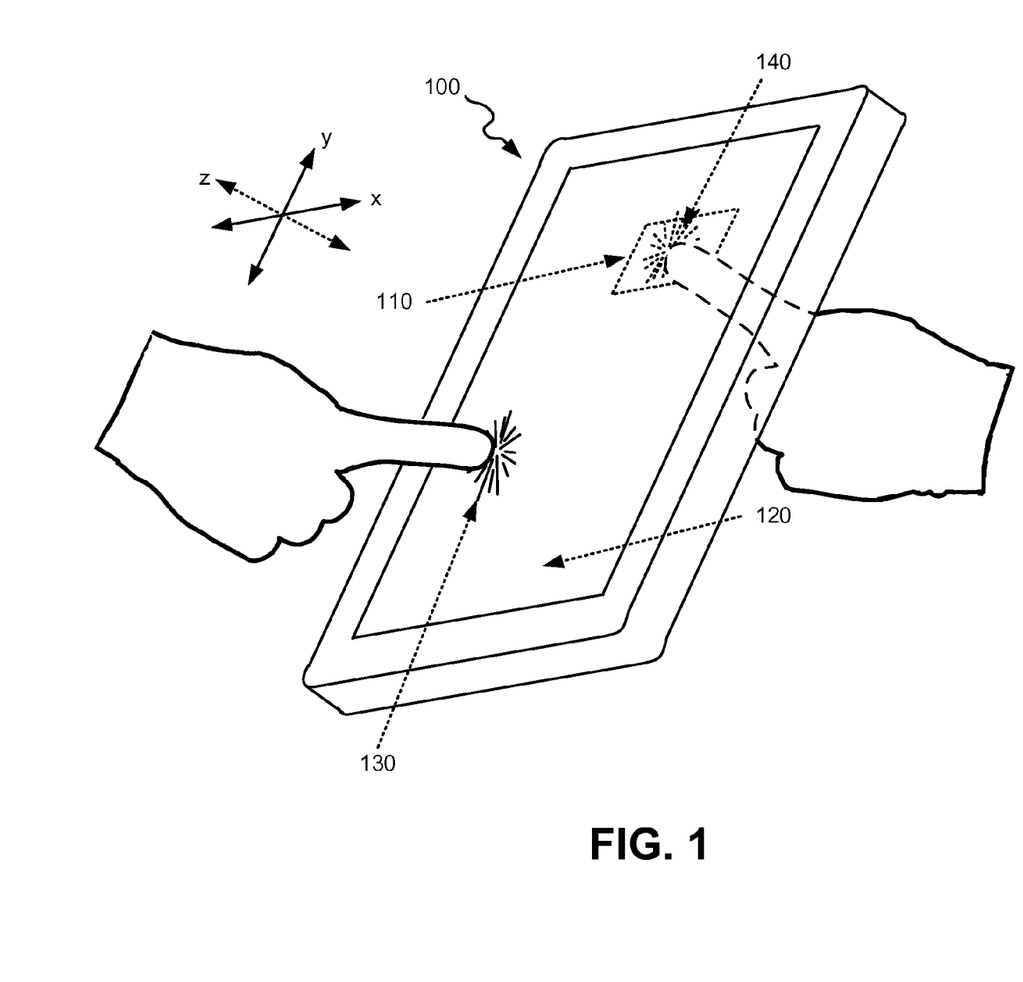
FIG. 1 is a diagram that illustrates an overview of the use of an additional touch interface on an electronic device to permit more degrees of freedom in controlling graphics displayed on the device's display.

FIG. 1 illustrates an overview of the use of an additional touch interface 110 on an electronic device 100 to permit more degrees of freedom in controlling graphics displayed on the device's display, such as, for example, more degrees of freedom in navigating in three dimensions (3-D) in graphics displayed on the device's display. As shown in FIG. 1, electronic device 100 may include a touch panel 120, disposed on a front of device 100, that may display graphics and which may permit control of the device via touch input 130 by the device user. Electronic device 100 may further include additional touch interface 110, disposed on the back of device 100, to permit additional control of device 100 via additional touch input 140. The terms "touch" or "touch input," as used herein, may refer to a touch of an object, such as a body part (e.g., a finger) or a pointing device (e.g., a stylus, pen, etc.).

Electronic device 100 may include any type of electronic device that includes a touch panel and display. For example, device 100 may include a cellular radiotelephone; a satellite navigation device; a smart phone; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; a gaming device; a media player device; a tablet computer; a digital camera; or another device that may use touch input. In some exemplary embodiments, device 100 may include a hand-held electronic device.

Touch panel 120 may be integrated with, and/or overlaid on, a display to form a touch screen or a panel-enabled display that may function as a user input interface. For example, in one implementation, touch panel 120 may include a near field-sensitive (e.g., capacitive), acoustically-sensitive (e.g., surface acoustic wave), photo-sensitive (e.g., infrared), and/or any other type of touch panel that allows a display to be used as an input device. In another implementation, touch panel 120 may include multiple touch-sensitive technologies. Generally, touch panel 120 may include any kind of technology that provides the ability to identify the occurrence of a touch upon touch panel 120.

The display associated with touch panel 120 may include a device that can display signals generated by device 100 as three dimensional text or images on a screen (e.g., a liquid crystal display (LCD), cathode ray tube (CRT) display, organic light-emitting diode (OLED) display, surface-conduction electro-emitter display (SED), plasma display, field emission display (FED), bistable display, etc.). In certain implementations, the display may provide a high-resolution, active-matrix presentation suitable for the wide variety of applications and features associated with typical devices. The display may provide visual information to the user and serve—in conjunction with touch panel 120—as a user interface to detect user input. Touch interface 110 may include a touch panel (e.g., similar to touch panel 120, but having smaller dimensions), or a joystick (e.g., a micro joystick designed for hand-held devices).

In one exemplary embodiment, touch input 130 to touch panel 120 may permit navigation within a three dimensional view on the display in x, y or z directions. Existing Presense or force feedback techniques may be used to navigate in the z direction (i.e., navigate in depth "into" the displayed 3-D view) within the three dimensional view on the display of device 100. For example, applying pressure on touch panel 120 at a single point may cause navigation in the z direction in depth into the 3-D view displayed on device 100. In this exemplary embodiment, touch input 140 to touch interface 110 may cause the displayed view to rotate angular to the movement of touch input 140 on touch interface 110. Therefore, using touch panel 120, in conjunction with touch interface 110, the user of device 100 may rotate and enter sideways into the 3-D view on the display of device 100. For example, in a "first person shooter" game, touch panel 120 on device 100 may be used to pan left, right, up, down, or in the z direction, while touch interface 110 may be used to adjust a heading in the 3-D view in 360 degrees on the x and y axes. Use of touch panel 120, in conjunction with touch interface 110, may, thus, permit the user to navigate sideways in depth in a 3-D view displayed on electronic device 100. Use of touch panel 120 to navigate in the 3-D view is described in more detail below with respect to FIGS. 4A and 4B.

Figure 2A:
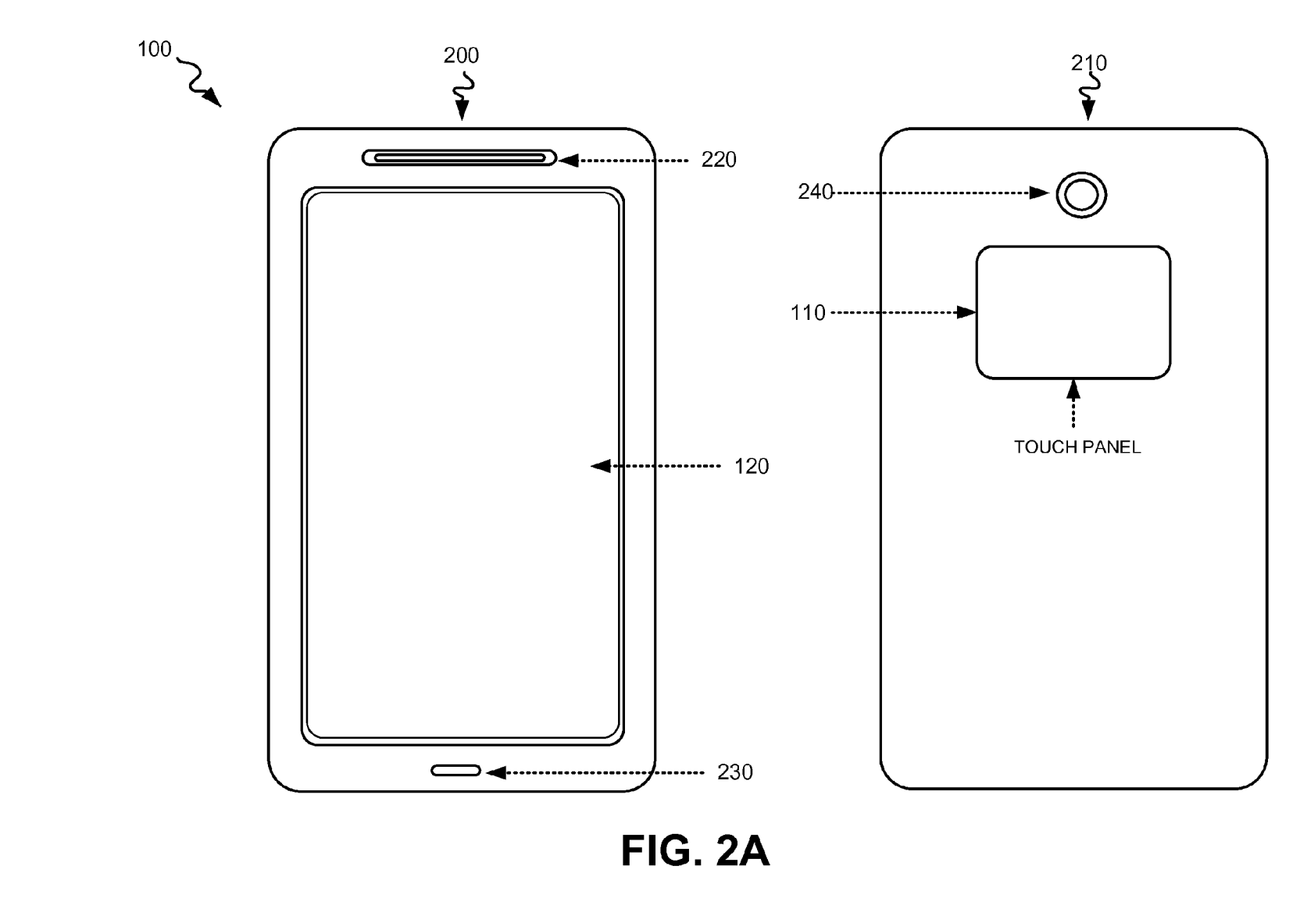
FIGS. 2A and 2B are diagrams that depict two different exemplary embodiments of the electronic device of FIG. 1.
Figure 2B:
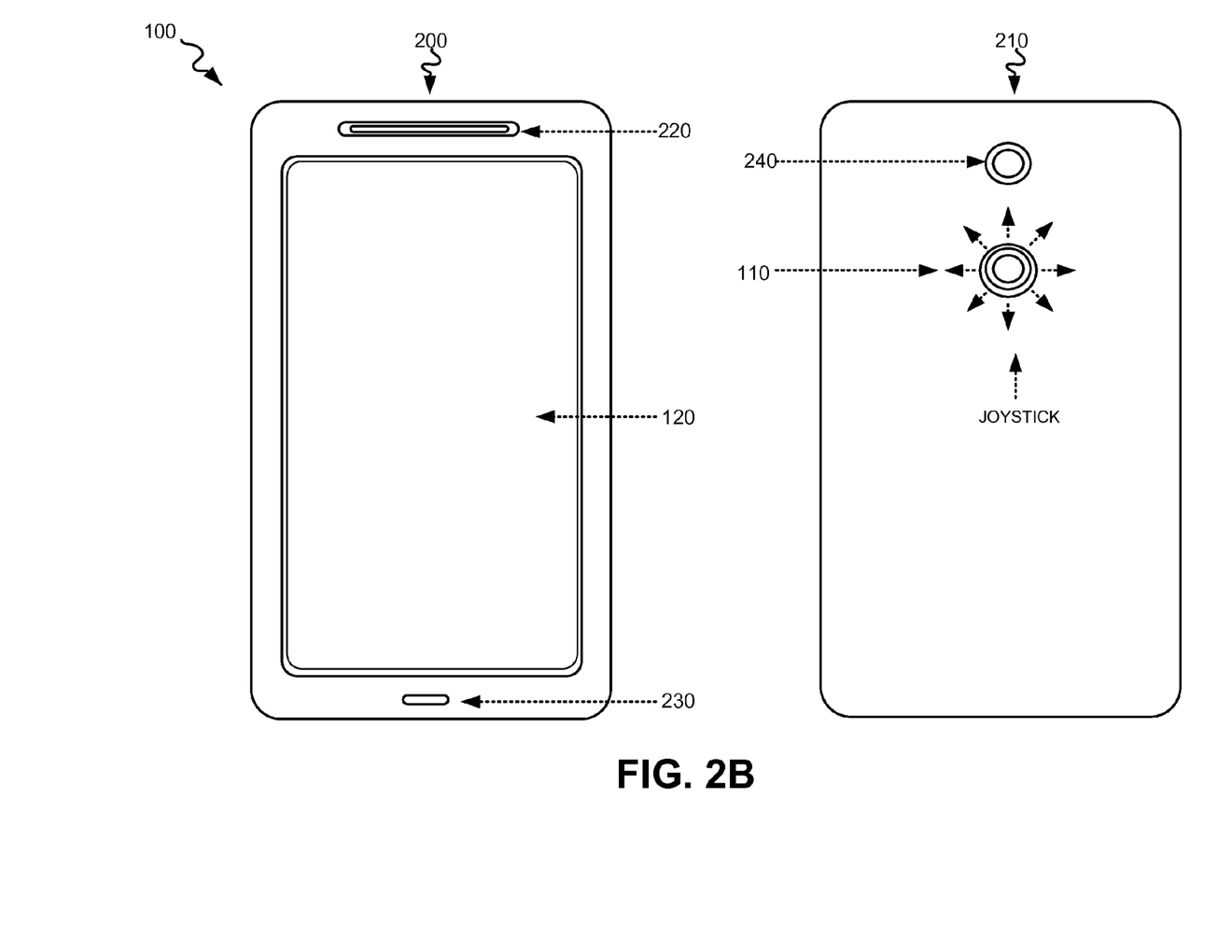

FIGS. 2A and 2B depict two different exemplary embodiments of device 100 where, in one embodiment, device 100 implements a touch panel for touch interface 110 and, in another embodiment, device 100 implements a joystick for touch interface 110. FIGS. 2A and 2B depict a front 200 and a rear 210 of device 100. As shown in FIGS. 2A and 2B, front 200 of device 100 may include touch panel 120, a speaker 220 and a microphone 230. As shown in FIG. 2A, rear 210 of device 100 may include a camera 240 and touch interface 110 may include a touch panel. As additionally shown in FIG. 2B, rear 210 of device 100 may include camera 240 and touch interface 110 may include a joystick.

Figure 3:
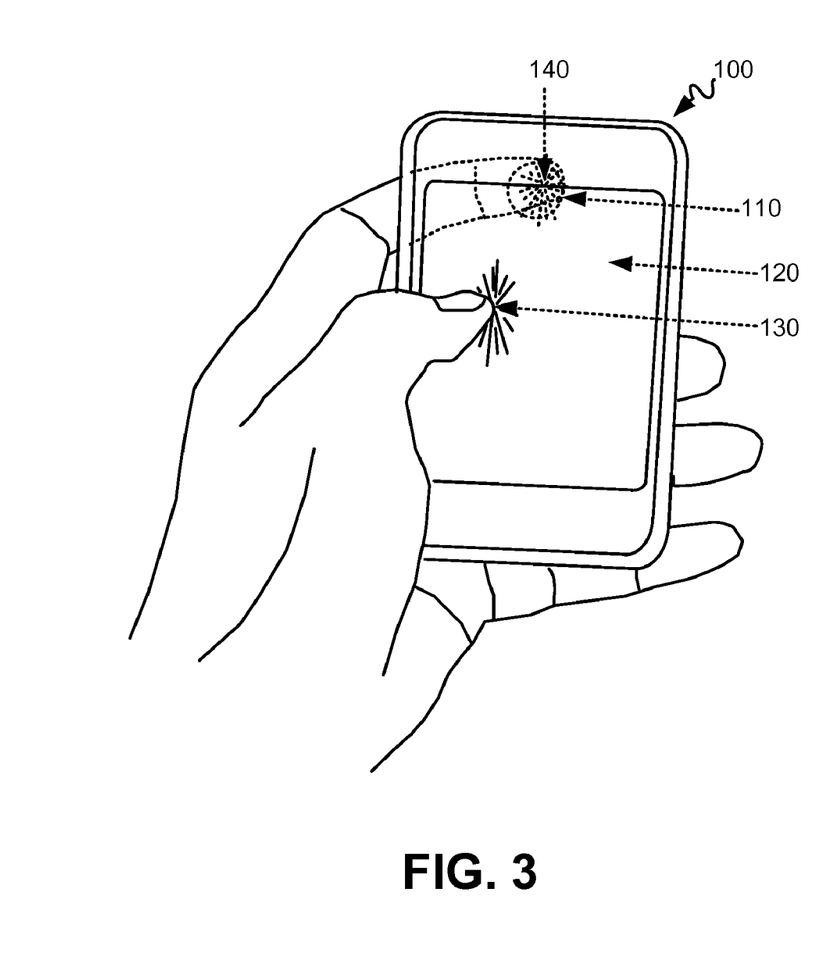
FIG. 3 is a diagram that depicts a user using the electronic device of FIG. 1 to navigate within a view of the display of the electronic device of FIG. 1 using both a touch panel on a front of the device and a touch interface on the rear of the device.

FIG. 3 depicts a user using device 100 to navigate within a view of the device 100's display using both a touch panel on a front of device 100 and a touch interface on the rear of device 100. As shown in FIG. 3, the user may hold device 100 such that one finger (e.g., a thumb) may apply touch input 130 to touch panel 120 on a front of device 100, and another finger (e.g., an index finger) may apply touch input 140 to touch interface 110 on a rear of device 100. Instead of using a thumb (as shown in FIG. 3) to apply touch input 130 to touch panel 120, user may alternatively use an index finger of the user's other hand to apply touch input 130 to touch panel 120.

Figure 4A:
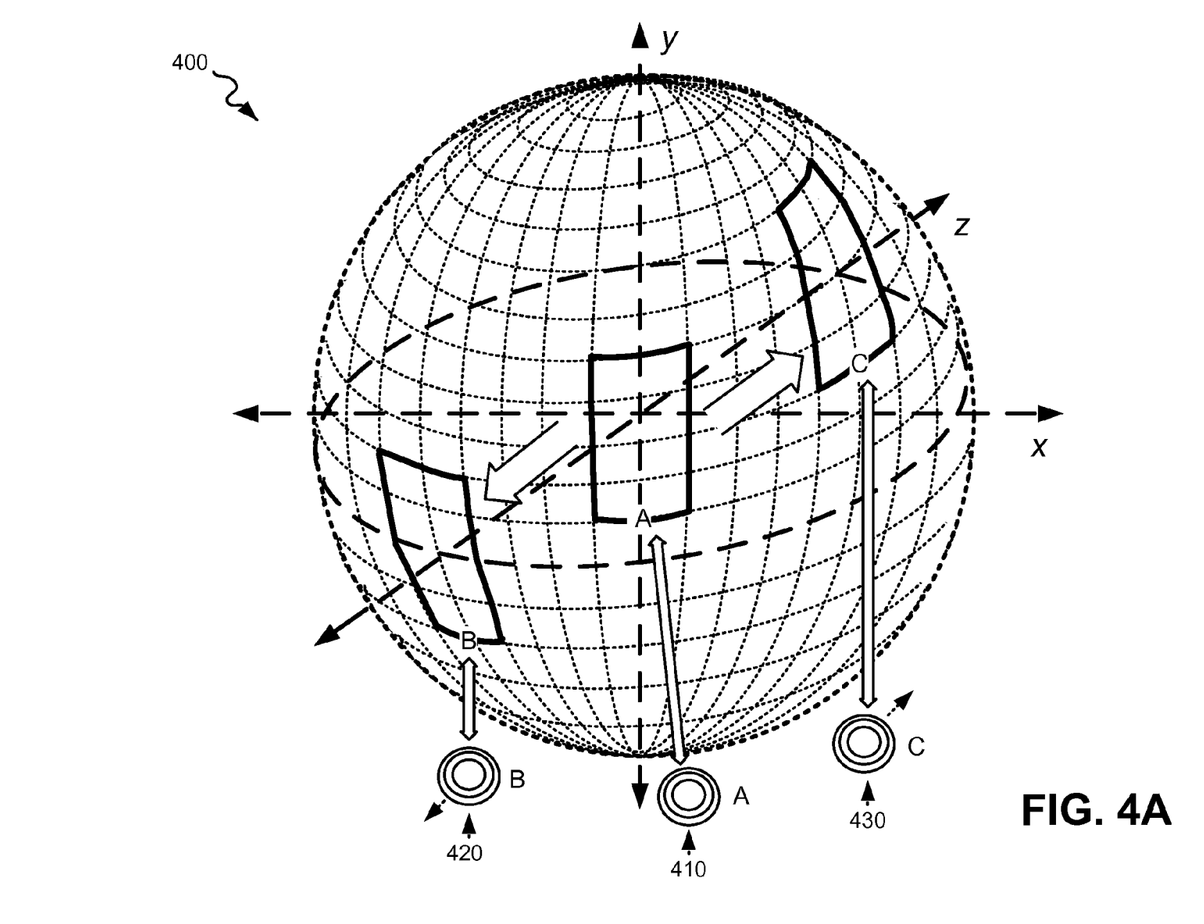
FIG. 4A is a diagram that illustrates exemplary navigation within a three-dimensional view that may be displayed on the display of the electronic device of FIG. 1.
Figure 4B:
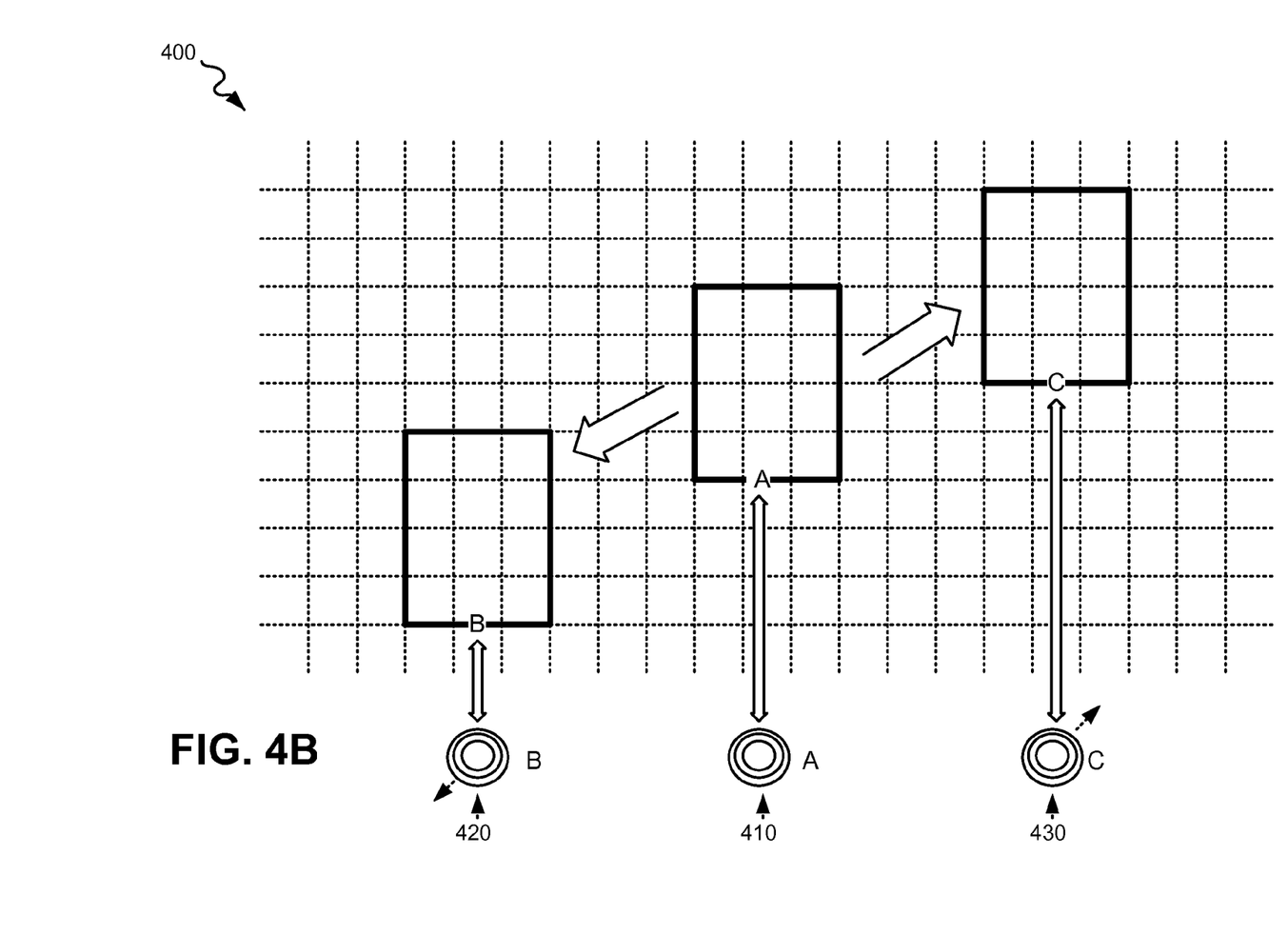
FIG. 4B is a diagram that further illustrates the exemplary navigation within the three dimensional view of FIG. 4A in a two-dimensional representation.

FIG. 4A illustrates exemplary navigation within a three-dimensional representation of a 3-D view 400 that may be displayed on the display of device 100. FIG. 4B further illustrates the exemplary navigation within the 3-D view 400 of FIG. 4A in a two-dimensional representation. FIG. 4A depicts 360 degrees of a background that may be displayed on the display of device 100. The particular view of the background may be altered based on touch input to touch interface 110. For example, as shown in FIGS. 4A and 4B, an initial view A may correspond to joystick touch interface 110 being in a centered position 410. The user may then adjust joystick touch interface 110 to a position 420 such that the 3-D view rotates down and left to a second view B. The user may subsequently adjust joystick touch interface 110 to a position 430 such that the 3-D view rotates up and to the right to a third view C. Through movement of joystick touch interface 110, the 3-D view 400 may be rotated angularly in 360 degrees in a direction that corresponds to the movement of joystick touch interface 110. By rotating the 3-D view angularly, use of joystick touch interface 110 on a rear of device 100 permits the 3-D view to be "entered" sideways thereby permitting an additional level of freedom during 3-D interface navigation.

Navigation within the 3-D view 400 shown in FIG. 4A may, therefore, correspond to changes in the azimuthal angle $\theta$ and the polar angle $\phi$ within a spherical coordinate system (with the radius r being held constant). In a spherical coordinate system, the azimuthal angle $\theta$ is measured in the x-y plane from the x-axis with $0 \leq \theta < 2\pi$. The polar angle $\phi$ is further measured from the positive z-axis with $0 \leq \phi < \pi$, and the radius r is the distance from the origin of the coordinate system. Using the spherical coordinate system as a model of 3-D view 400, then movement of the joystick touch interface 110 on a rear of device 100 may cause corresponding changes in the azimuthal angle $\theta$ and the polar angle $\phi$ within the spherical coordinate system. 3-D view 400 may, thus, rotate up to 360 degrees around the spherical coordinate system in any direction (shown in FIG. 4A in the movement between A, B and C).

Exemplary Device

Figure 5:
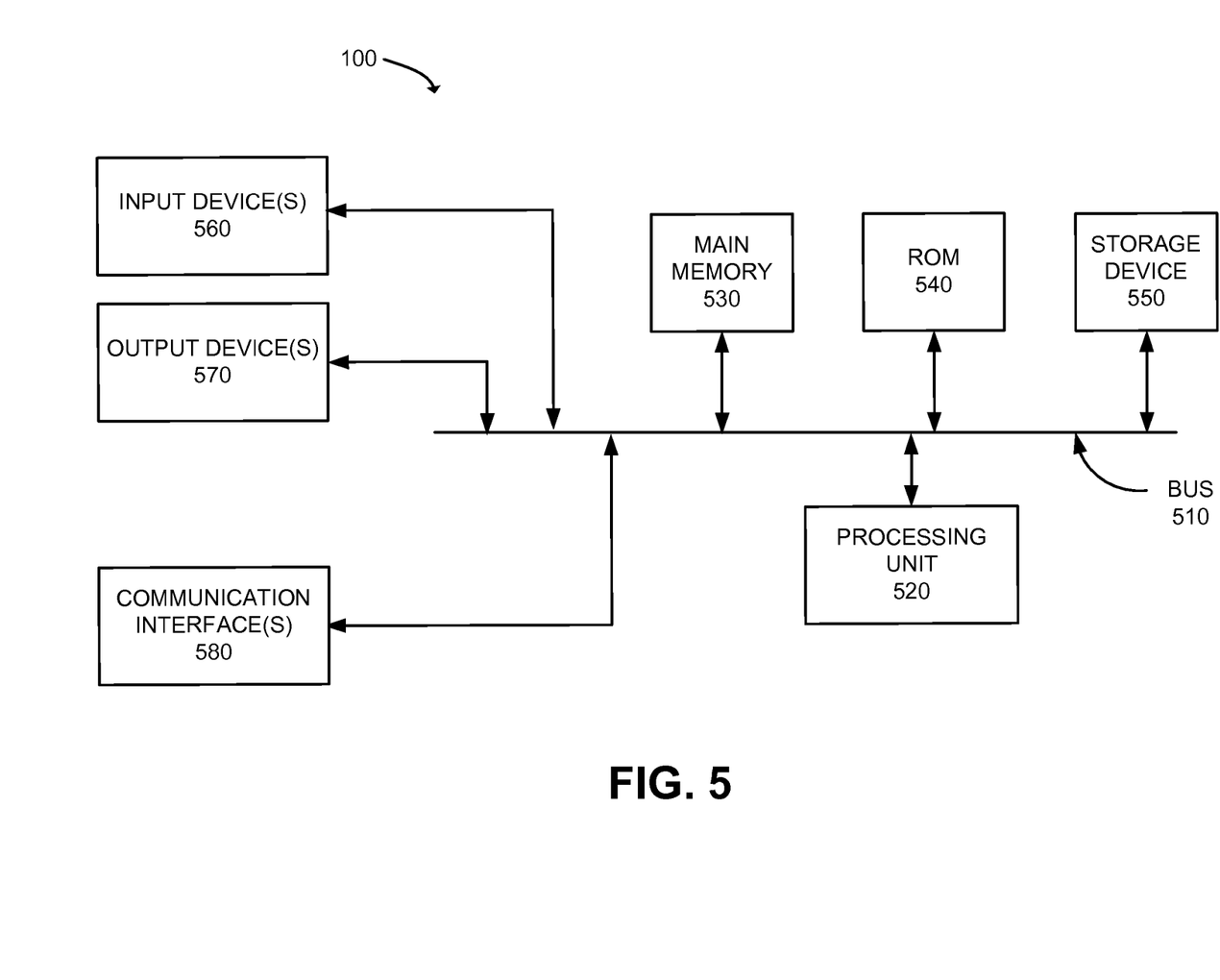
FIG. 5 is a block diagram that depicts exemplary components of the electronic device of FIG. 1.

FIG. 5 is a block diagram that depicts exemplary components of device 100. As illustrated, device 100 may include a bus 510, a processing unit 520, a main memory 530, a read only memory (ROM) 540, a storage device 550, an input device(s) 560, an output device(s) 570, and a communication interface(s) 580. Bus 510 may include a path that permits communication among the elements of device 100.

Processing unit 520 may include a conventional processor, microprocessor, or processing logic that may interpret and execute instructions. Main memory 530 may include a random access memory (RAM) or another type of dynamic storage device that may store information and instructions for execution by processor 520. ROM 540 may include a conventional ROM device or another type of static storage device that may store static information and instructions for use by processing unit 520. Storage device 550 may include a magnetic and/or optical recording medium and its corresponding drive.

Input device 560 may include a mechanism that permits a user to input information to device 100, such as a mouse, a pen, voice recognition and/or biometric mechanisms, etc. Input device 560 may further include touch panel 110 described above. Output device 570 may include a mechanism that outputs information to the operator, including a display, a printer, a speaker, etc. Communication interface 580 may include any transceiver-like mechanism that enables device 100 to communicate with other devices and/or systems.

Device 100 may perform certain operations or processes described herein. Device 100 may perform these operations in response to processing unit 520 executing software instructions contained in a computer-readable medium, such as memory 530. A computer-readable medium may be defined as a physical or logical memory device. Each of main memory 530, ROM 540 and storage device 550 may include computer-readable media. The magnetic and/or optical recording media (e.g., readable CDs or DVDs) of storage device 550 may also include computer-readable media.

The software instructions may be read into memory 530 from another computer-readable medium, such as data storage device 550, or from another device via communication interface 580. The software instructions contained in memory 530 may cause processing unit 520 to perform operations or processes described herein. Alternatively, hardwired circuitry may be used in place of or in combination with software instructions to implement processes described herein. Thus, implementations described herein are not limited to any specific combination of hardware circuitry and software. Device 100 may include additional, fewer, and/or different components or differently configured components than those depicted in FIG. 5.

Figure 6:
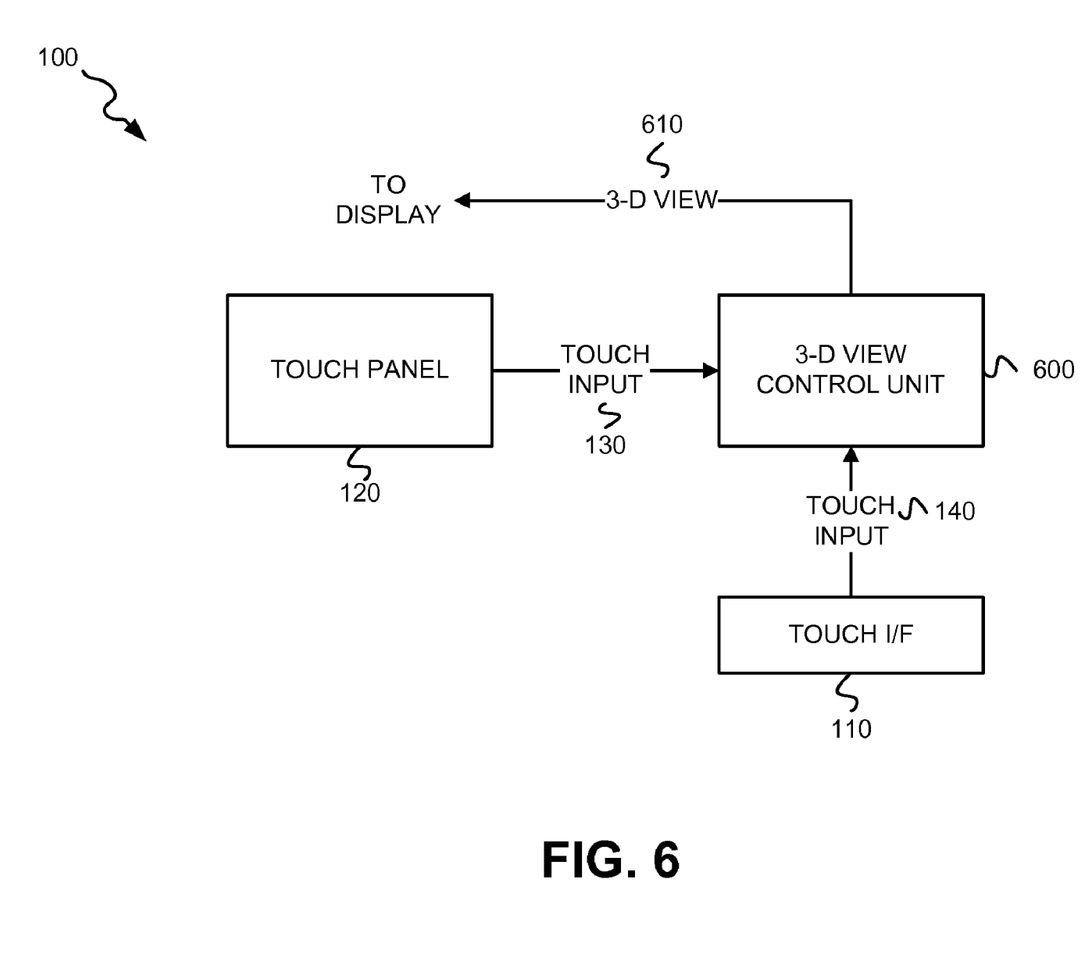
FIG. 6 is a diagram that depicts an exemplary functional interaction between components of the electronic device of FIG. 1.

FIG. 6 depicts an exemplary functional interaction between components of device 100. As shown in FIG. 6, a 3-D view control unit 600 may receive indications of touch inputs 130 and 140 from touch panel 120 and touch interface 110, respectively. 3-D view control unit 600 may, for example, be implemented by processing unit 520. Based on the indication of touch input 130 from touch panel 120, 3-D view control unit 600 may determine alterations to the view on the device 100's display in the x, y and/or z directions. Based on the indication of touch input 140 from touch interface 110, 3-D view control unit 600 may rotate the 3-D view angularly along the x and y axes in correspondence with the movement of the touch input on touch interface 110. 3-D view control unit 600 may supply the generated 3-D view 610 to the display (not shown) for generating a 3-D view on the display.

Exemplary Process

Figure 7:
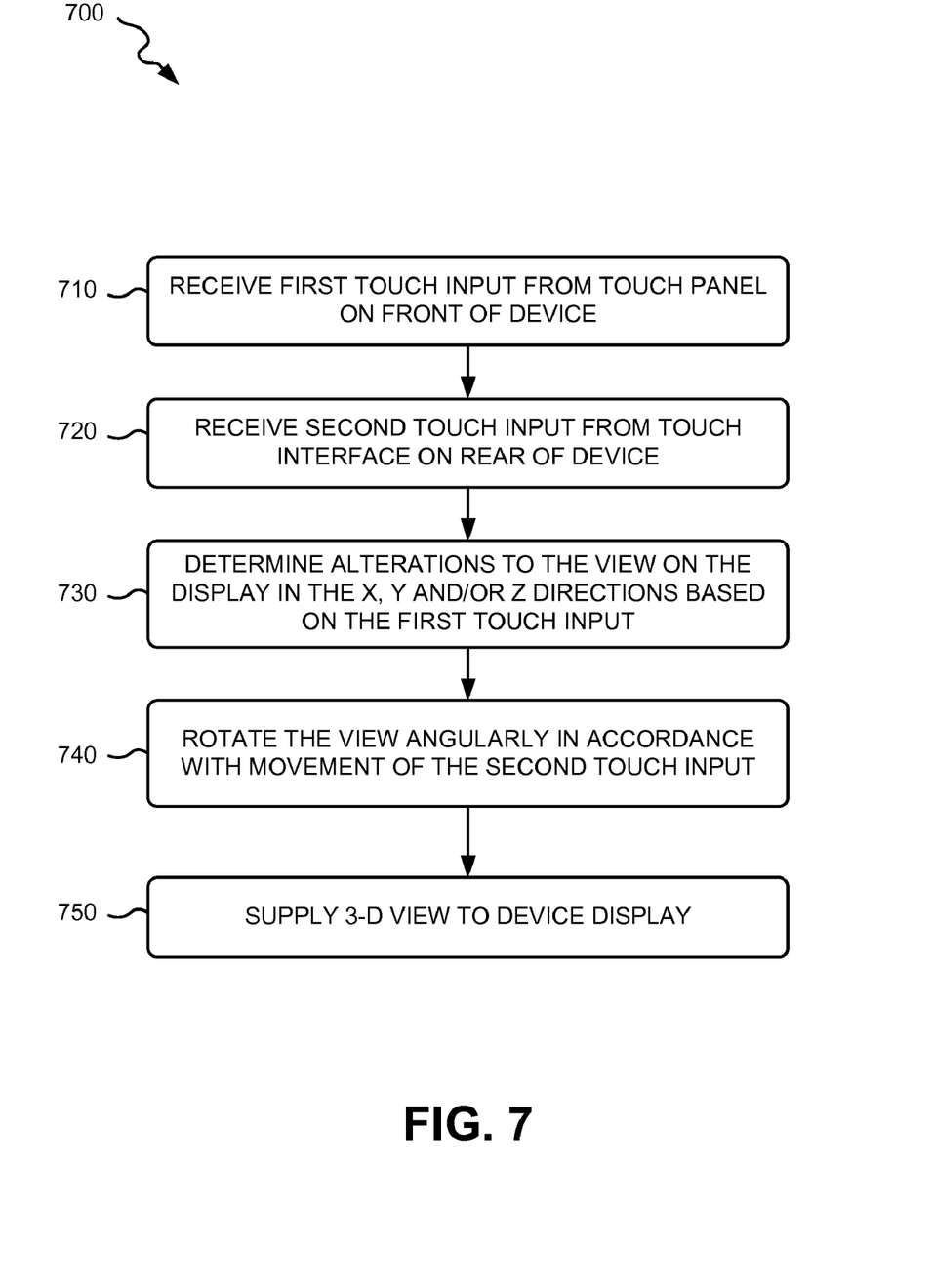
FIG. 7 is a flow diagram illustrating an exemplary process for controlling navigation within a three dimensional view displayed on a display of the electronic device of FIG. 1 based on touch inputs applied to the touch panel and to the separate touch interface.

FIG. 7 is a flow diagram illustrating an exemplary process 700 for controlling navigation within a 3-D view displayed on a display of device 100 based on touch inputs applied to touch panel 120 and to the separate touch interface 110. The exemplary process of FIG. 7 may be performed by 3-D view control unit 600, possibly in conjunction with other components of device 100.

The exemplary process may include receiving a first touch input from touch panel 120 on the front of device 100 (block 710). Referring to FIG. 3, the user, while holding device 100, may apply touch input 130 to touch panel 120 on front of device 100. 3-D view control unit 600 may further receive a second touch input from touch interface 110 on the rear of device 100 (block 720). Referring again to FIG. 3, the user, while holding device 100, may apply touch input 140 to touch interface 110 on the rear of device 100.

Alterations to the view on the display in the x, y and/or z directions may be determined based on the received first touch input (block 730). 3-D view control unit 600 may determine alterations to be applied to the view on the display of device 100 based on touch input 130 received from touch panel 120. For example, 3-D view control unit 600 may determine changes in the view on the display in the x and y direction (i.e., in the length and width directions of the display), and in the z direction (i.e., in depth into the display) that correspond to the user's touch input.

The 3-D view, altered in block 730, may be rotated angularly in accordance with movement of the second touch input (block 740). 3-D view control unit 600 may rotate the view angularly up to 360 degrees in a direction that corresponds to the movement of touch input 140 on touch interface 110. Referring back to FIG. 4A, when the user of device 100 moves the joystick touch interface 110 in a direction shown at 420, the 3-D view correspondingly moves angularly along the spherical view from view A to view B. By rotating the 3-D view angularly, use of touch interface 110 on a rear of device 100 permits the view to be "entered" sideways thereby permitting an additional level of freedom during 3-D interface navigation. Rotating the 3-D view angularly may correspond to causing changes in the azimuthal angle $\theta$ and the polar angle $\phi$ if the view of the display of device 100 is modeled as a spherical coordinate system (coordinates in a spherical coordinate system being the azimuthal angle $\theta$, the polar angle $\phi$, and the radius r).

Conclusion

Implementations described herein provide an additional touch interface that permits enhanced navigation in three dimensions on a display of an electronic device. In some exemplary embodiments, a location of the additional touch interface on the rear of the electronic device, in addition to having a touch panel and display on the front of the device, permits the user to use one finger to adjust the view on the display using the touch panel, and to use another finger to further adjust the view on the display using the touch interface on the rear of the device. In exemplary embodiments, touch inputs to the touch panel on the front of the device may adjust the view on the display in the x, y and/or z directions whereas touch inputs to the touch interface on the rear of the device may adjust the 3-D view angularly in the direction of movement of the touch input. By rotating the 3-D view angularly, use of touch interface 110 on a rear of device 100 permits the 3-D view to be "entered" sideways, thereby, permitting an additional level of freedom during 3-D interface navigation.

The foregoing description of the embodiments described herein provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 7, the order of the blocks may be varied in other implementations. Moreover, non-dependent blocks may be performed in parallel.

Certain features described herein may be implemented as "logic" or as a "unit" that performs one or more functions. This logic or unit may include hardware, such as one or more processors, microprocessors, application specific integrated circuits, or field programmable gate arrays, software, or a combination of hardware and software.

The term "comprises" or "comprising" as used herein, including the claims, specifies the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

What is claimed is:

1. An electronic device, comprising:
   a first touch panel disposed on a first side of the device and configured to receive a first touch input;
   a display disposed on the first side of the device;
   a touch interface configured to receive a second touch input, wherein the touch interface is disposed on a second side of the device that is different than the first side of the device;
   a control unit configured to:
      receive an indication of the first touch input from the first touch panel,
      receive an indication of the second touch input from the touch interface,
      determine alterations to a three dimensional view of a background displayed on the display in x, y and z directions, or x, y or z directions, based on the first touch input,
      navigate within the three dimensional view of the background displayed on the display by causing changes, based on the indication of the second touch input, in an azimuthal angle $\theta$ and a polar angle $\phi$ with a radius r being held constant, within a spherical coordinate system associated with the three dimensional view of the background displayed on the display, wherein the spherical coordinate system includes coordinates $\theta$, $\phi$, and r, and cause the display to display the three dimensional view of the background.

2. The electronic device of claim 1, wherein the electronic device is a hand-held electronic device.

3. The electronic device of claim 1, wherein the electronic device comprises one of a cellular radiotelephone, a satellite navigation device, a smart phone, a Personal Communications System (PCS) terminal, a personal digital assistant (PDA), a gaming device, a media player device, a tablet computer, or a digital camera.

4. The electronic device of claim 1, wherein the first touch panel comprises at least one of a near field-sensitive, an acoustically-sensitive, or a photo-sensitive touch panel.

5. The electronic device of claim 1, wherein the touch interface comprises one of a joystick or a second touch panel.

6. The electronic device of claim 5, wherein the second touch panel comprises at least one of a near field-sensitive, an acoustically-sensitive, or a photo-sensitive touch panel.

7. The electronic device of claim 1, wherein the display includes a liquid crystal display (LCD), a cathode ray tube (CRT) display, an organic light-emitting diode (OLED) display, a surface-conduction electro-emitter display (SED), a plasma display, a field emission display (FED), or a bistable display.

8. The electronic device of claim 1, wherein the first touch panel is integrated with, or overlaid upon, the display.

9. The electronic device of claim 1, wherein the azimuthal angle $\theta$ is measured in an x-y plane from an x-axis with $0 \leq \theta < 2\pi$, wherein the polar angle $\phi$ is measured from a positive z-axis with $0 \leq \phi < \pi$, and wherein the radius r is a distance from an origin of a x-y-z coordinate system.

10. A method, comprising:
receiving an indication of a first touch input on a first touch panel disposed on an electronic device;
receiving an indication of a second touch input on a touch interface that is disposed on the electronic device separately from the first touch panel;
determining alterations to a three dimensional view of a background displayed on a display disposed on the electronic device in x, y and z directions, or x, y or z directions, based on the indication of the first touch input;
navigating within the three dimensional view of the background displayed on the display by causing changes, based on the indication of the second touch input, in an azimuthal angle $\theta$ and a polar angle $\phi$ with a radius r being held constant, within a spherical coordinate system associated with the three dimensional view of the background displayed on the display, wherein the spherical coordinate system includes coordinates $\theta$, $\phi$, and r, and
causing the display to display the three dimensional view of the background.

11. The method of claim 10, wherein the electronic device comprises one of a cellular radiotelephone, a satellite navigation device, a smart phone; a Personal Communications System (PCS) terminal, a personal digital assistant (PDA), a gaming device, a media player device; a tablet computer, or a digital camera.

12. The method of claim 10, wherein the first touch panel comprises at least one of a near field-sensitive, an acoustically-sensitive, or a photo-sensitive touch panel.

13. The method of claim 10, wherein the touch interface comprises one of a joystick or a second touch panel.

14. The method of claim 13, wherein the second touch panel comprises at least one of a near field-sensitive, an acoustically-sensitive, or a photo-sensitive touch panel.

15. The method of claim 10, wherein the display includes a liquid crystal display (LCD), a cathode ray tube (CRT) display, an organic light-emitting diode (OLED) display, a surface-conduction electro-emitter display (SED), a plasma display, a field emission display (FED), or a bistable display.

16. The method of claim 10, wherein the azimuthal angle $\theta$ is measured in an x-y plane from an x-axis with $0 \leq \theta < 2\pi$, wherein the polar angle $\phi$ is measured from a positive z-axis with $0 \leq \phi < \pi$, and wherein the radius r is a distance from an origin of a x-y-z coordinate system.

17. A tangible non-transitory computer-readable medium containing instructions executable by at least one processing unit, the computer-readable medium, comprising:
one or more instructions for receiving an indication of a first touch input on a first touch panel disposed on an electronic device;
one or more instructions for receiving an indication of a second touch input on a touch interface that is disposed on the electronic device separately from the first touch panel;
one or more instructions for determining alterations to a three dimensional view of a background displayed on a display disposed on the electronic device in x, y and z directions, or in x, y or z directions, based on the indication of the first touch input;
one or more instructions for navigating within the three dimensional view of the background displayed on the display by causing changes, based on the indication of the second touch input, in an azimuthal angle $\theta$ and a polar angle $\phi$, with a radius r being held constant, within a spherical coordinate system associated with the three dimensional view of the background displayed on the display, wherein the spherical coordinate system includes coordinates $\theta$, $\phi$, and r; and
one or more instructions for causing the display to display the three dimensional view of the background.

18. The tangible non-transitory computer-readable medium of claim 17, wherein the azimuthal angle $\theta$ is measured in an x-y plane from an x-axis with $0 \leq \theta < 2\pi$, wherein the polar angle $\phi$ is measured from a positive z-axis with $0 \leq \phi < \pi$, and wherein the radius r is a distance from an origin of a x-y-z coordinate system.

\* \* \* \* \*